United States Patent [19]

Willim

[11] Patent Number: 4,491,451

[45] Date of Patent: Jan. 1, 1985

[54] WORK HANDLING ASSEMBLY FOR DEPOSITING A WORKPIECE INTO THE DIE SPACE OF A DROP-FORGING PRESS

[75] Inventor: Friedrich Willim, Leverkusen, Fed. Rep. of Germany

[73] Assignee: Eumuco Aktiengesellschaft für Maschinenbau, Fed. Rep. of Germany

[21] Appl. No.: 411,128

[22] Filed: Aug. 24, 1982

[30] Foreign Application Priority Data

Sep. 12, 1981 [DE] Fed. Rep. of Germany ....... 3136169

[51] Int. Cl.³ ................................................ B66C 1/42
[52] U.S. Cl. ...................................... 414/732; 72/422; 414/735
[58] Field of Search ............... 414/735, 733, 732, 917; 74/519, 96; 198/486, 489; 72/422

[56] References Cited

U.S. PATENT DOCUMENTS

| | | | |
|---|---|---|---|
| 3,759,563 | 9/1973 | Kitamura | 414/4 X |
| 3,765,474 | 10/1973 | Burton | 414/733 X |
| 4,342,536 | 8/1982 | Akeel et al. | 414/744 A |

FOREIGN PATENT DOCUMENTS 743544 1/1956 United Kingdom .................. 72/422

Primary Examiner—Joseph E. Valenza
Assistant Examiner—Donald W. Underwood
Attorney, Agent, or Firm—Neil F. Markva

[57] ABSTRACT

A work handling assembly deposits a workpiece travelling from a pick-up point to a deposit point in the die space of a drop-forging press. The assembly comprises a pincer assembly mounted on a hinged quadrilateral mechanism to move between a workpiece pick-up station and a workpiece deposit work station. The hinged quadrilateral mechanism is driven by a crank gear assembly and includes one fixed side portion and two hinged side portions movably mounted to the fixed hinged side portion. The pincer assembly is rotatably connected to the free ends of the movable hinged side portions. Each of the movable hinged portions include a lever member with one of the lever members being longer than the other lever member. The longer lever member is rotatably connected to a front portion of the pincer assembly.

12 Claims, 5 Drawing Figures

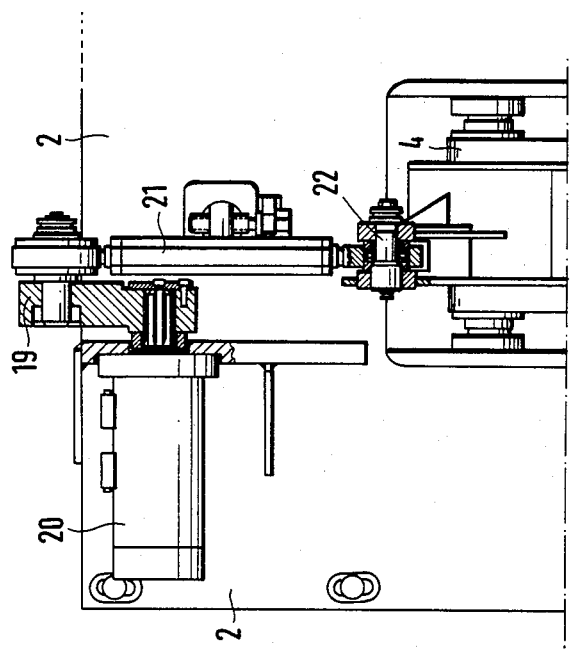
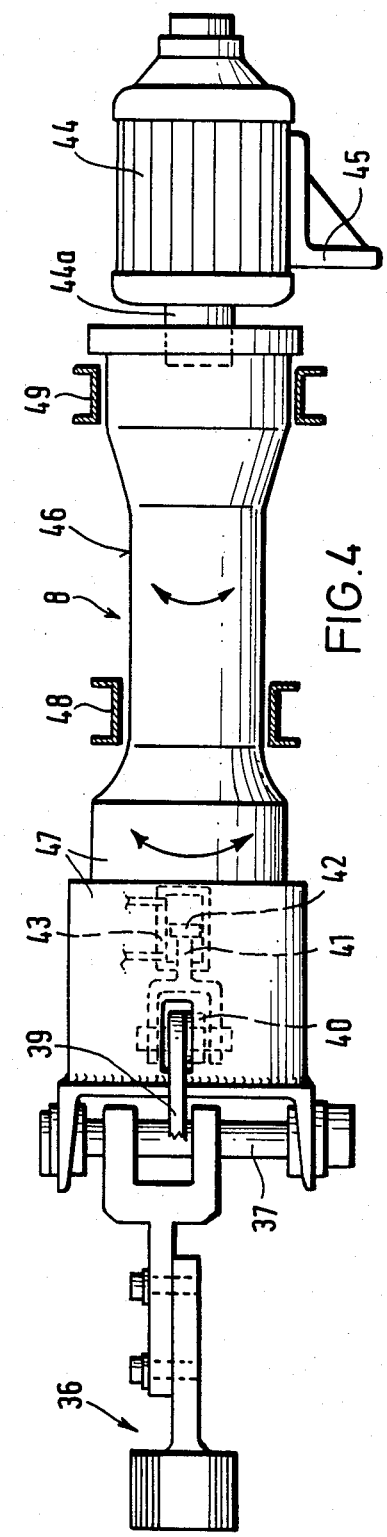
FIG. 3
FIG. 4

WORK HANDLING ASSEMBLY FOR DEPOSITING A WORKPIECE INTO THE DIE SPACE OF A DROP-FORGING PRESS

FIELD OF THE INVENTION

The invention relates to an assembly for depositing a workpiece travelling from a pick-up point to a deposit point in the die space of a drop-forging press and the like. More particularly, the pick-up point is located in the transfer point of a heating unit and the assembly is a mechanically operated work handling apparatus.

BACKGROUND OF THE INVENTION

It is known to fit drop forging presses with a so-called automatic lifting beam for the automatic transfer of workpieces within the pressing area where the achievable numbers of lifts could be increased by special arrangements. An essential point in the operation of automated drop-forging presses is an automatic supply of workpieces to the die space of the drop-forging press. it is known to use chain conveyors to effect the transport of the workpiece from a preparation point to the pressing area. Such chain conveyors are connected to corresponding transfer devices. Other work handling devices bridge greater distances at constant speed but the paths are limited by fixed stops. Such known devices operate unsteadily. The depositing of the workpieces in the die space of the press is rough. Functional security, particularly in the event of a short sequence of strokes, is unsatisfactory. This is particularly true for fast running machines in which the workpieces must be made available in approximately 1.5 second stroke.

A further disadvantage of known work handling devices is the convenience that these devices have to be mounted partially below the transport plane of the workpieces. This leads to difficult conditions resulting from increased contaminations and to corresponding wear. Moreover, depending upon the workpiece being forged, the initial material must be able to be deposited in the die space either horizontally or upright. This has required the use of work handling assemblies which are different in structure and function. Thus, the potential universal use of the automatic drop forging press was significantly limited.

Of particular importance in the operation of automated drop-forging presses is a safe supply of heated workpieces in accordance with strokes from a heating unit to a suitable deposit point in the die space of the drop-forging press. The heated workpiece coming from the heating unit is normally made available outside the press in a defined position. It would be useful, for reasons of the sequence of strokes and functional safety, to locate this point as close as possible to the automatic drop-forging press. However, for structural reasons this is substantially impossible because attention must be paid to the space available for dismantling and accessability when arranging the heating unit with respect to the drop-forging press.

PURPOSE OF THE INVENTION

The primary object of the invention is to provide a work handling assembly for supplying workpieces to a drop-forging press which guarantees functionally safe, accurate movement of the workpiece to be transported from a pick-up point to a deposit point without any mechanical end stops.

It is another object of the invention to provide a work handling device which will coordinate the movement of workpieces from an adjacent work station where the workpieces are supplied in regular intervals to the particular operation of the automated drop-forging press. A further object of the invention is to provide a work handling assembly which carries out an area of swing in which a steady speed pattern is produced and includes a pincer assembly for picking up and depositing the workpiece at end points whereby the pincer assembly is carried along continually above a maximum speed to a speed of zero. The process of movement for the work handling assembly continues without interruption and includes short stroke times which may be maintained safely and reliably.

It is a still further object of the invention to provide a work handling assembly which will enable the use of relatively large distances between the pick-up and transfer points which can be bridged e.g. where such distances between the pick-up and transfer points may be from about 1.5 to about 2 meters.

SUMMARY OF THE INVENTION

The working handling assembly as disclosed and described herein comprises a pincer assembly mounted on a hinged quadrilateral mechanism to move between a workpiece pick-up work station and a workpiece deposit work station. The hinged quadrilateral mechanism is driven by a crank gear assembly. The quadrilateral mechanism includes one fixed hinged side portion and two hinged portions movable mounted to the fixed hinged side portion. The pincer assembly is rotatably connected to the free ends of the movable hinged side portions. Each of the movable hinged portions include a lever member with one of the lever members being longer than the other lever member. The longer lever member is rotatably connected to a front portion of the pincer assembly.

The work handling assembly of the invention may be used with drop forging presses automated with lifting beam systems and as an automatic depositing device for hand operated drop forging presses. Thus, the accurate deposit of the workpiece into the first forging step is no longer left up to the operator. This is important because it is the first forging step that the distribution of material in the die is established. A reliably even deposit of the heated workpiece in the first step leads to a lower reject rate.

The particular connection between the hinged quadrilateral and the pincer assembly enables the bridging of large spaces between the heating unit and the drop-forging press. It is also possible that the pincer assembly may carry out a curved-shaped movement on the basis of which the workpiece can be introduced more or less obliquely from above into the deposit point in the die space.

A further feature of the invention is directed to the use of a push rod which hingedly connects the crank gear to the longer lever of the hinged quadrilateral mechanism. Thus, the push rod is a driving device in combination with the crank gear assembly. The longer lever can also be designed as an angle lever to facilitate drive and to achieve the desired curved path.

Another advantage of the work handling assembly of the invention is that it may be arranged above the transporting plane of the workpieces. Here, the housing of the fixed hinged side portion of the hinged quadrilateral mechanism can run in the perpendicular. The housing may be vertically adjustable.

A further feature of the invention is directed to the structure for rotating the pincer assembly about its longitudinal axis. Thus, it is possible to deposit the workpieces horizontally or upright in the die space of the drop forging press. The pincer assembly includes work gripping members which close and open with respect to each other around the workpieces to grip or release the workpieces being handled. The rotatability of the pincer assembly is effected by a hydraulic or pneumatic drive mechanism with a control being effected in dependence upon the movement of the work handling assembly. A longitudinal orientation of the workpiece in the pressing area is necessary if workpieces are forged which have a linear extension. However, it is necessary to deposit the workpiece in an upright position, if, for example, round parts are being forged in the drop-forging press.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 3 is a side elevational view partially in section of the crank gear used with the assembly of the invention;

FIG. 4 is an elevational view of the device for turning and clamping the gripping parts with the pincers shown partly in longitudinal section.

DETAILED DESCRIPTION

Figure 1:
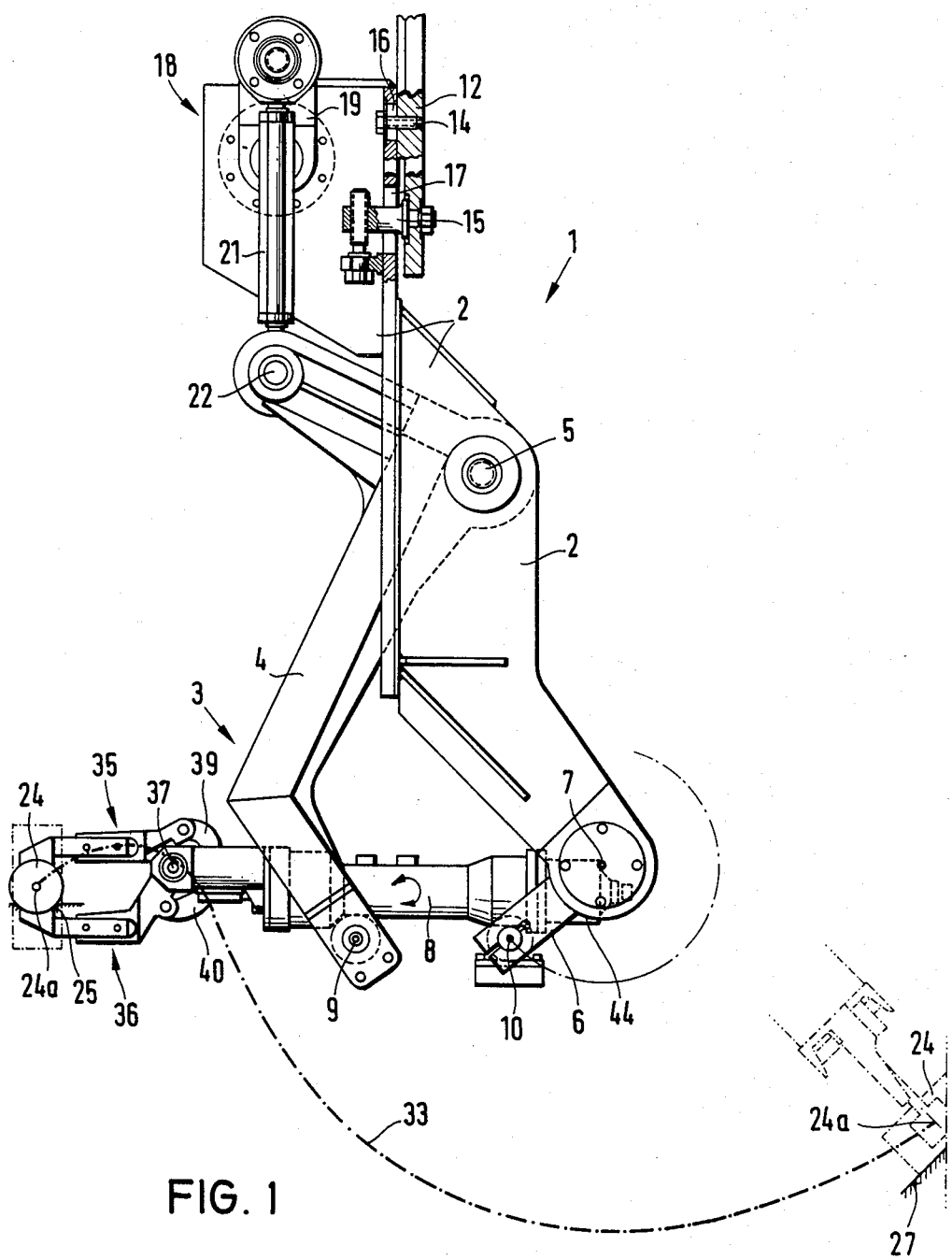
FIG. 1 is an elevational view of a work handling assembly made in accordance with this invention showing how a workpiece is brought to the deposit point in the die space of a drop-forging press.

The work handling device, generally designated 1, comprises a housing 2 having a hinged quadrilateral 3 pivotally mounted thereon. A first lever 4 of the hinged quadrilateral 3 is rotatably mounted on housing 2 at pivot point 5 and another lever 6 is mounted at pivot point 7. Pincer assembly 8 is hinged to fulcrums 9 and 10 at the free ends of the levers 4 and 6, respectively. Housing 2 is secured to the machine frame 12 of drop forging press 13 and represents the fixed side of the hinged quadrilateral 3. Bolts 14 and 15 and longitudinal apertures 16 and 17 enable housing 2 to be vertically adjustable along the machine frame 12. Crank gear, generally designated 18, moves the levers 4 and 6 and pincer assembly 8 of the hinged quadrilateral 3. Crank gear 18 comprises a rotating limb 19 driven by a motor 20. Push rod 21 pivotally connects the free end of crank limb 19 to lever 4 at pivot point 22. Crank gear 18 may have a hydraulically or pneumatically operating pivot drive or an electrical drive.

Lever 4 is hingedly contacted to the front part of the pincer assembly 8 and is longer than the other lever 6 which constitute the movable hinged sides of the hinged quadrilateral 3. Thus, during the operation of the assembly, it is possible to have a wide pivoting of the pincer assembly 8. The long lever 4 is designed as an angle lever. Consequently, there is a good structural cooperation between the crank gear 18 and the lever 4 while providing a great freedom of movement for the pincer assembly 8. The work handling device 1 is located above the transporting plane for workpiece 24. Housing 2 is arranged in the perpendicular as a fixed hinged side of the hinged quadrilateral 3.

Figure 2:
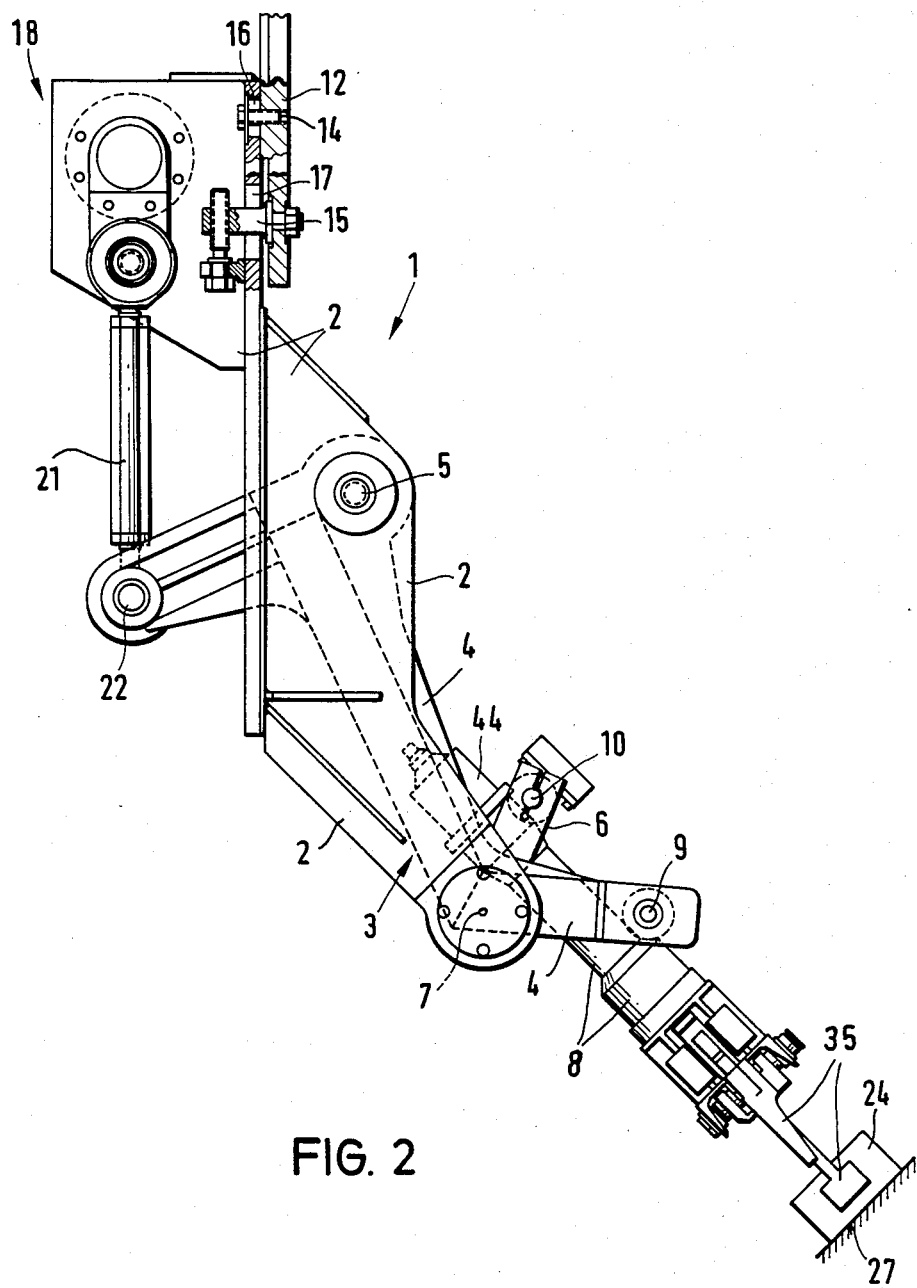
FIG. 2 is an elevational view of the assembly shown in FIG. 1 with the position of the parts of the work handling assembly showing the workpiece being picked-up at the pick-up point with the pincers of the assembly.
Figure 5:
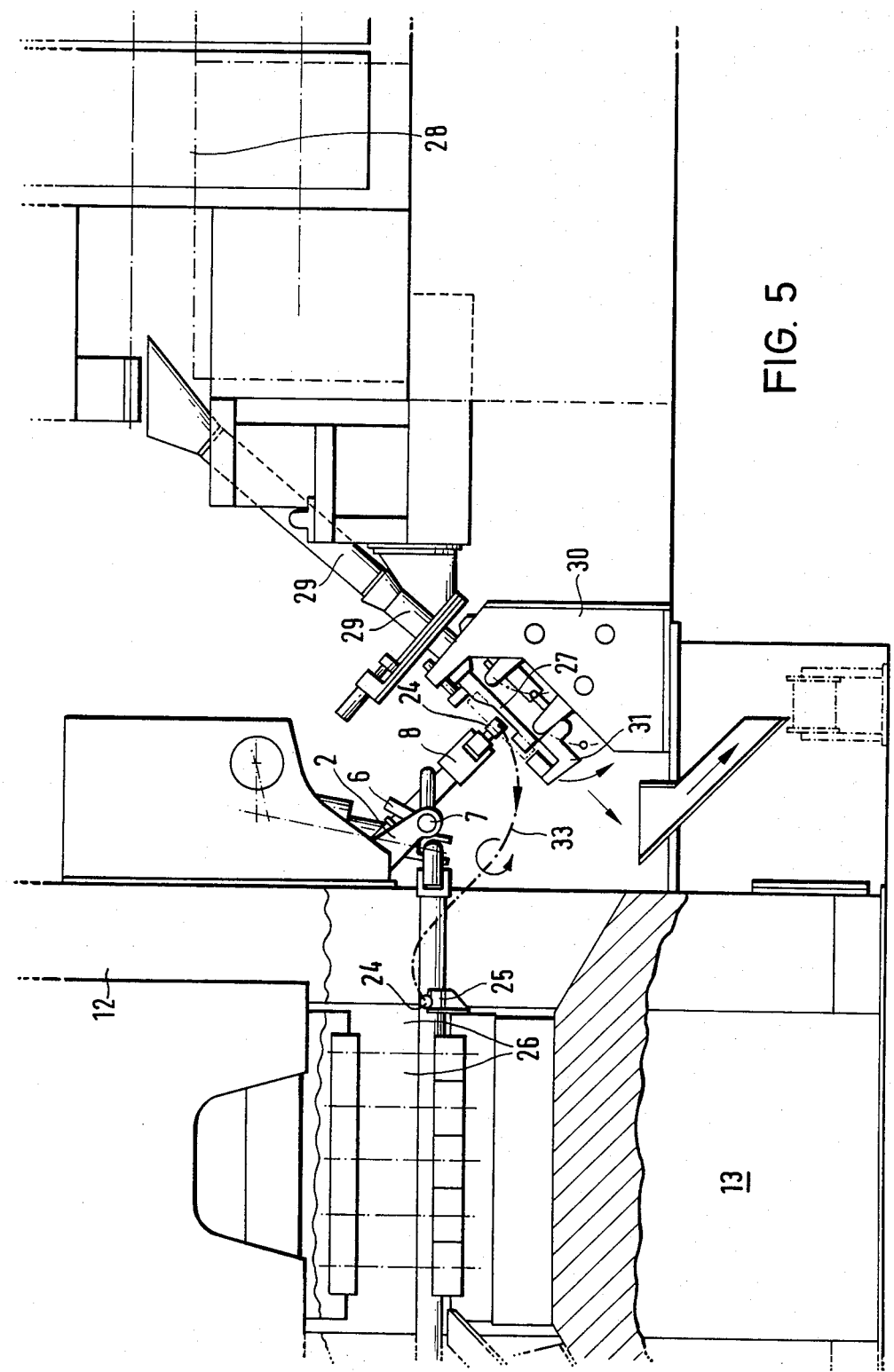
FIG. 5 is an elevational view of the arrangement showing the work handling assembly of the invention on a drop-forging press having a heating unit for the workpieces.

FIG. 1 shows the position of the various parts of the work handling assembly 1 when workpiece 24 is released at the point of deposit 25 in die space 26 of drop-forging press 13. When crank gear 18 completes a rotation of 180°, the parts of the hinged quadrilateral 3 move into the position shown in FIG. 2. Here, pincer assembly 8 is positioned at pick-up point 27 where workpiece 24 e.g. a heating unit 28, is available in a stored position. As shown in FIG. 5, a supply channel 29 has appropriate gate runs from a heating unit 28 to the transfer assembly 30 having a movable stop 31 to align the workpiece 24 at the pick-up point 27.

The pincer assembly 8 comprises gripping members 35 and 36 pivotally mounted on shaft 37. Limbs 39 and 40 connected to piston rod 42 and piston 42 operate the gripping members 35 and 36, respectively as piston 42 moves back and forth in the cylinder 43. The piston 42 and cylinder 43 may be hydraulically or pneumatically operated. As the gripping members 35 and 36 move together and apart with respect to each other, workpiece 24 is picked-up or released accordingly.

The path of movement for the middle part 24a of workpiece 24 is shown by the dash dotted curve 33 in FIG. 1. That is, as gripping members 35 and 36 close around workpiece 24, the movement of the workpiece 24 is shown from the pick-up point 27 to the deposit point 25 and back along curve 33. Appropriate measured localization of the gear members of hinged quadrilateral 3 moves heated workpiece 24 from pick-up point 27 of heating unit 28 in accordance with strokes and accurately to transfer point 25 within the pressing area 26 of drop-forging press 13.

With respect to the work handling assembly of this invention, there is no external mechanical stops necessary in the area of swing for the lever member 4. Each 180° rotation of pivot drive of the crank gear assembly 18 effects a back and forth movement for the pincer assembly 8. There is a sine-shaped speed pattern on push rod 21 of crank gear assembly 18 as the pivot drive rotates. Thus, the speed of lever 4 and, therefore, pincer assembly 8 reaches the value zero at the end points 25 and 27 for each 180° rotation. Thus, workpiece 24 may be picked-up or deposited at these points without any obstruction. The movement of the parts of the work handling assembly 1 starts smoothly with the speed zero at the pick-up point 27. It then automatically runs continually beyond a maximum speed in order to end smoothly once again with the speed zero at the point of deposit 25.

Referring to FIG. 5, workpiece 24 is advantageously made available at an inclination of 45° within the pick-up point 27. In this particular embodiment, workpiece 24 has a longitudinal axis and the angle of inclination is measured therealong. It is necessary to deposit the workpiece 24 with its longitudinal direction being appropriately located within die space 26 of drop-forging press 13. Consequently, it is necessary to rotate workpiece 24 as it is travelling from pick-up point 27 to the deposit point 25 within the die space 26. A hydraulically or pneumatically operated drive arrangement 44 effects the necessary rotation of the workpiece by 90° around the longitudinal axis of the pincer assembly 8. Drive arrangement 44 is secured to a support 45 and rotates housing 46 which is mounted in bearings 48 and 49. Shaft 44a is connected to housing 46 which is rotated a predetermined angle along with the further housing 47 which is fixedly connected to housing 46. As housing 47 is rotated, gripping elements 35 and 36 are fixedly connected to housing 47 and are therefore also rotated. Gripping elements 35 and 36 carry out a rotation of 90° around their longitudinal axis independently of the opening and closing thereof.

The rotatability of pincer assembly 8 makes it possible to deposit workpieces 24 at the transfer point 25 either oriented in a longitudinal direction or upright in the die space of the press when made available at the pick-up point 27 of heating unit 28. The control for crank gear assembly 18, the opening and closing movement of gripping members 35 and 36 and the rotation of pincer assembly 8 around its longitudinal axis by 90° are all coordinated with one another by a separate switching device in dependence on the position and movement of the work handling assembly of the invention.

While the work handling assembly for depositing a workpiece into the die space of a drop-forging press has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A work handling assembly for depositing a workpiece travelling from a pick-up point to a deposit point in the die space of a drop-forging press, said assembly comprising:
   (a) a pincer assembly mounted to form a fourth hinge side on a hinged quadrilateral mechanism and to move between a workpiece pick-up work station and a workpiece deposit work station,
   (b) a hinged quadrilateral mechanism being driven by a crank gear assembly,
   (c) said quadrilateral mechanism including one fixed hinged side portion and two hinged side portions mounted to the fixed hinged side portion and being movable between an initial workpiece pick-up position and a subsequent workpiece deposit position,
   (d) said pincer assembly being rotatably connected to the free ends of the movable hinged side portions thereby forming said fourth hinge side,
   (e) each of the movable hinged portions including a lever member with one of the lever members being longer than the other lever member which is directed outwardly away from the longer lever member when in the initial workpiece pick-up position,
   (f) the longer lever member being rotatably connected to a front portion of the pincer assembly which has an outer, gripping tool carrying end,
   (g) said quadrilateral mechanism being effective to cause the outer, gripping tool carrying end to travel along a curved path between the workpiece pick-up and deposit positions.

2. An assembly as defined in claim 1 wherein the pincer assembly is rotatable about its longitudinal axis.

3. An assembly as defined in either claim 1 or 2 wherein the fixed hinge side portion runs in the perpendicular plane and is vertically adjustable along the frame of the drop forging press.

4. An assembly as defined in claim 1 wherein the work handling assembly is located above the transport plane of the workpieces.

5. An assembly as defined in claim 1 wherein the longer lever member consists of an angle lever.

6. A work handling assembly for depositing a workpiece travelling from a pick-up point to a deposit point in the die space of a drop-forging press, said assembly comprising:
   (a) a pincer assembly mounted on a hinged quadrilateral mechanism to move between a workpiece pick-up work station and a workpiece deposit work station,
   (b) a hinged quadrilateral mechanism being driven by a crank gear assembly,
   (c) said quadrilateral mechanism including one fixed hinged side portion and two hinged side portions movably mounted to the fixed hinged side portion,
   (d) said pincer assembly being rotatably connected to the free ends of the movable hinged side portions,
   (e) each of the movable hinged portions including a lever member with one of the lever members being longer than the other level member,
   (f) the longer lever member being rotatably connected to a front portion of the pincer assembly,
   (g) a push rod hingedly connects the crank gear assembly to the longer lever member.

7. An assembly as defined in claim 1 wherein the shorter lever member is rotatably connected to a rear portion of the pincer assembly.

8. An assembly as defined in claim 1 wherein the pincer assembly includes a means for operating a pair of gripping members which open and close with respect to each other to pick-up or release a workpiece.

9. An assembly as defined in claim 1 wherein the pincer assembly is located above the workpiece deposit work station and is effective to introduce the workpiece being moved obliquely from above to the deposit point in the die space.

10. An assembly as defined in claim 1 wherein the crank gear assembly includes a motor and a rotatably mounted crank arm hingedly connected to one end of a push rod with the other end of the push rod being hingedly connected to the longer lever member,
said motor being effective to rotate said crank arm.

11. An assembly as defined in claim 1 wherein the longer lever member has an angular configuration with a lower bent portion extending in a direction toward the other shorter lever member.

12. An assembly as defined in claim 1 wherein a push rod hingedly connects the crank gear assembly to the longer lever member.

* * * * *